July 31, 1934.  C. O. YOUNG  1,968,512
PROCESS FOR PURIFYING LIQUIDS
Filed Dec. 7, 1931
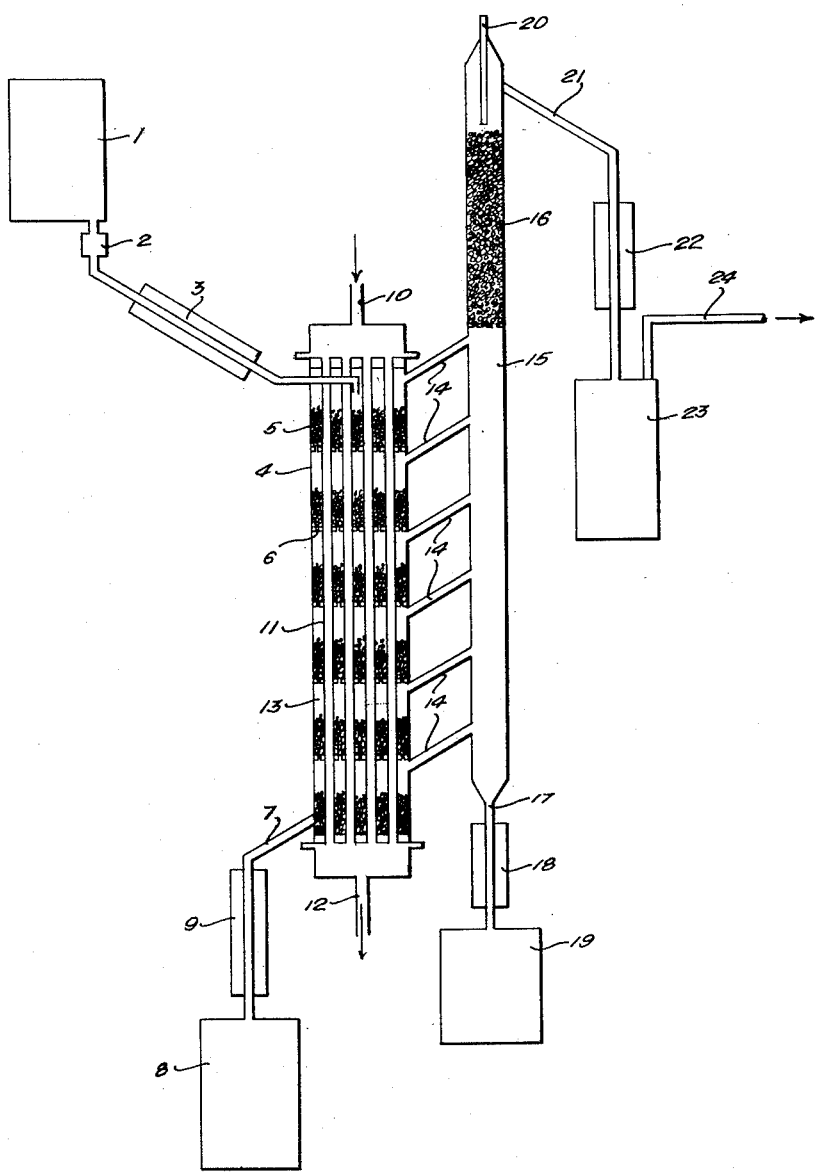
INVENTOR:
Charles O. Young, Deceased
By Marian N. Young, Executrix,
BY    ATTORNEYS Patented July 31, 1934

1,968,512

UNITED STATES PATENT OFFICE 1,968,512

PROCESS FOR PURIFYING LIQUIDS

Charles O. Young, deceased, late of Charleston, W. Va., by Marion K. Young, executrix, Charleston, W. Va., assignor to Carbide and Carbon Chemicals Corporation, a corporation of New York Application December 7, 1931, Serial No. 579,574

4 Claims. (Cl. 202—40)

This invention relates to the separation and purification of organic liquids, referring more specifically to a novel process for the separation and purification of high boiling, thermally unstable organic liquids.

High boiling, or relatively unstable organic compounds are frequently purified by distillation under reduced pressure, in a batch process. Under these conditions a portion of the charge remains in the still kettle at its boiling point for a considerable length of time, and this frequently results in loss of material through thermal decomposition.

A continuous distillation process under reduced pressure is sometimes employed, wherein the material to be treated enters a distilling column and descends over packing material or trays countercurrent to the ascending vapors. Such a system reduces the time that the material remains heated at its boiling point, but even in this process there occurs an undesirably long contact between the high boiling residue and the unstable volatile components, and if the process is applied to certain mixtures it results in the decomposition of some of the volatile material.

The inventor has devised a continuous system of distillation which not only avoids these difficulties but also makes possible the simultaneous separation of unstable volatile organic compounds from non-volatile material and the rectification of the volatile components. The novel system is particularly suitable for use in purifying and rectifying mixtures of hydroxy alkylamines, such as the ethanolamines and the isopropanolamines, but is of value in the treatment of many other mixtures of organic compounds, including for example mixtures of alkylene and polyalkylene glycols such as one containing ethylene glycol, diethylene glycol, triethylene glycol and higher boiling compounds.

Similarly, a mixture of alkylene and polyalkylene amines, such as ethylene diamine, diethylene triamine, triethylene tetramine and heavier compounds may advantageously be treated by my process. Dialkyl sulfates, such as diethyl sulfate, may also be removed by my process from the acid liquor obtained by diluting sulfuric acid which contains absorbed olefines, with but little loss of the dialkyl sulfate through decomposition.

In general, the process may be described as consisting essentially in introducing the crude material, with or without preheating, into the top of a vaporizing column which is so arranged that heat is applied to the descending liquid and the vapors rapidly removed, as they are evolved, from a number of outlets placed at intervals from top to bottom of the column. In this way the vaporized fraction does not remain in contact with the unvaporized residuum for more than a short time. At the base of the column the non-volatile residuum is removed through a cooler. The above-mentioned vapor outlets lead into a rectifying section which permits separation of the vaporized components into fractions. The process is preferably carried out under reduced pressure (i. e. under subatmospheric pressure), and the apparatus may be heated by any suitable means, such as with steam or hot oil.

The operation of the process may be more readily understood by referring to the accompanying drawing, which is a diagrammatic representation of a suitable apparatus for carrying out the process. In the operation of the process, the mixture to be treated is placed in a feed tank 1, and flows thence through a regulating valve 2 into a feed pipe and therein through a preheater 3 into a column 4. The mixture flows down through packing material 5 supported on trays 6 of the column 4, and the residue passes out through the bottom of the column 4 through a discharge pipe 7 and into a receiver 8, by way of a cooler 9. The mixture within the column is heated by steam or hot oil, which enters through a pipe 10, flows down the column through heating pipes 11, and leaves the column through a discharge pipe 12. The vapors evolved by the heating of the liquid mixture are rapidly removed from the vapor spaces 13 by vapor outlet pipes 14 which may lead into a common header or manifold 15. The manifold 15 is connected to a rectifying section 16. In some cases it will be more convenient to omit the manifold 15, in which case the tubes 14 will be connected directly to the rectifying section 16. The heavy ends from the rectifying section 16 and the condensate from the manifold 15 are discharged through a pipe 17 and a cooler 18 and collected in a receiver 19. The vapors coming from the top of the rectifying section 16 pass a thermometer 20 and are taken off through a vapor pipe 21 which conducts the vapors through a condenser 22. The condensate is collected in a receiver 23 to which is connected a vacuum line 24.

It will be seen that in the column 4 no great amount of rectification is accomplished; the volatile portion is merely removed rapidly from the non-volatile portion so as to prevent undue decomposition of the volatile materials. Rectification of the volatile materials is carried out in the rectifying section 16, out of any contact with the non-volatile portion. Thus, distillation and rectification are accomplished without appreciable decomposition of the volatile compounds. In this connection it should be noted that by rectification is meant the interaction of a vapor, rising from a vaporizing means, with the condensate from a part of the vapor previously evolved, whereby the vapor is enriched with and the condensate is stripped of intermediate-boiling constituents.

Tests which the inventor has made, using the novel process, demonstrate its advantages and usefulness. For example, a mixture obtained by the action of ethylene oxide and ammonia, from which the water and unchanged ammonia had been removed by simple evaporation, was treated according to the process at an absolute pressure of about 5 mm. of mercury. The mixture before treatment had the following approximate composition:

|  | Per cent |
|---|---|
| Water | 0.3 |
| Monoethanolamine | 4.7 |
| Diethanolamine | 19.8 |
| Triethanolamine | 73.6 |
| High boiling compounds | 1.6 |

During treatment, the non-volatile residue was collected in the receiver 8, and this portion contained the major part of the high-boiling compounds, together with a small quantity of triethanolamine. The vapors passed into the vapor header 15, where considerable rectification occurred, the material which collected in receiver 19 constituting the less volatile fraction and having approximately the following composition:

|  | Per cent |
|---|---|
| Water | 0.1 |
| Monoethanolamine | Nil |
| Diethanolamine | 0.5 |
| Triethanolamine | 98.5 |
| High boiling compounds | 0.9 |

The most volatile fraction was removed from the top of the rectifying section 16, and after condensing was collected in receiver 23. This last fraction had about the following composition:

|  | Per cent |
|---|---|
| Water | 1.1 |
| Monoethanolamine | 12.1 |
| Diethanolamine | 36.1 |
| Triethanolamine | 50.4 |
| High boiling compounds | 0.3 |

It is evident that many variations may be made in the construction of the apparatus for carrying out the process, and that the invention is not limited to the specific form described herein. For example, instead of a packed column, a tray or plate containing column might be used, or in some cases a spray column. Also, the applicability of the process is not limited to the specific compounds mentioned, but to the general class of high-boiling thermally unstable organic liquids. The inventor should be limited therefore only to the invention as disclosed herein and defined by the appended claims.

The inventor claims:

1. Process for purifying and separating mixtures of high-boiling, thermally unstable organic liquids without serious decomposition by distillation under subatmospheric pressure which comprises applying heat continuously, progressively and indirectly to said mixture, removing vapors therefrom as rapidly as they are evolved during said heating, rectifying said removed vapors out of contact with the unvaporized residue and without further application of heat to said vapors and separately recovering the fractions of vaporized material and the residue.

2. Process for purifying and separating mixtures of high-boiling, thermally unstable aliphatic amines without serious decomposition by distillation under subatmospheric pressure which comprises applying heat continuously, progressively and indirectly to said mixture, removing vapors therefrom as rapidly as they are evolved during said heating, fractionating said removed vapors out of contact with the unvaporized residue and without further application of heat to said vapors and separately recovering the fractions of vaporized material and the residue.

3. Process for purifying and separating mixtures of alkyleneamines and polyalkyleneamines without serious decomposition by distillation under subatmospheric pressure which comprises applying heat continuously, progressively and indirectly to said mixture, removing vapors therefrom as rapidly as they are evolved during said heating, fractionating said removed vapors out of contact with the unvaporized residue and without further application of heat to said vapors and separately recovering the fractions of vaporized material and the residue.

4. Process for purifying and separating mixtures of mono-, di-, and triethanolamine without serious decomposition by distillation under subatmospheric pressure which comprises applying heat continuously, progressively and indirectly to said mixture, removing vapors therefrom as rapidly as they are evolved during said heating, fractionating said removed vapors out of contact with the unvaporized residue and without further application of heat to said vapors and separately recovering the fractions of vaporized material and the residue.

MARION K. YOUNG,
*Executrix of the Last Will and Testament of Charles O. Young, Deceased.*